(12) United States Patent
Hutchison et al.

(10) Patent No.: US 6,345,479 B1
(45) Date of Patent: *Feb. 12, 2002

(54) HINGED THERMOPLASTIC STRUCTURAL PIECE CONTAINING INJECTION MOLDED PORTION

(75) Inventors: Herbert Hutchison, Gahanna; Paul R. Pelfrey, Pickerington; Byron W. Rose, Williamsport, all of OH (US)

(73) Assignee: Crane Plastics Manufacturing Ltd., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,754

(22) Filed: Jul. 12, 1999

(51) Int. Cl.[7] .................................. E04C 1/00
(52) U.S. Cl. ..................... 52/309.1; 52/290; 52/716.8; 428/195
(58) Field of Search ............................ 52/71, 239, 290, 52/716.8; 264/251, 254, 297.2, 297.8; 428/156, 126, 195, 57, 58, 178

(56) References Cited

U.S. PATENT DOCUMENTS

| | | | | |
|---|---|---|---|---|
| 3,580,536 A | * | 5/1971 | Nichols | 248/459 |
| 3,612,639 A | * | 10/1971 | Williams | 312/330 |
| 3,831,334 A | * | 8/1974 | Rutkowski | 52/290 X |
| 4,157,413 A | * | 6/1979 | Ruhl | 428/159 |
| 4,285,093 A | * | 8/1981 | Kundin | 16/17 |
| 4,314,716 A | * | 2/1982 | Errichiello | 281/29 |
| 4,463,046 A | * | 7/1984 | Hutchison et al. | 428/156 |
| 5,459,969 A | * | 10/1995 | Stibolt et al. | 52/716.8 X |
| 5,814,391 A | * | 9/1998 | Hutchison et al. | 428/195 |
| 5,879,770 A | * | 3/1999 | Hutchison et al. | 428/58 |
| 5,965,238 A | * | 10/1999 | Saitoh et al. | 428/178 |
| 6,071,455 A | * | 6/2000 | Hutchison et al. | 264/251 |
| 6,076,327 A | * | 6/2000 | Hendrickson | 52/716.8 X |

* cited by examiner

Primary Examiner—Bruce A. Lev
(74) Attorney, Agent, or Firm—Standley & Gilchrist LLP

(57) ABSTRACT

A thermoplastic, synthetic resin, baseboard panel or piece having a plurality of hinged sections and including resilient injection molded portions is presented. The panel or piece may be used in a variety of applications such as to provide sealing ends on thermoplastic panels or to create resiliently closeable passages in thermoplastic panels through which wires and other objects may be passed while maintaining an even surface appearance of the baseboard panel.

22 Claims, 9 Drawing Sheets

HINGED THERMOPLASTIC STRUCTURAL PIECE CONTAINING INJECTION MOLDED PORTION

BACKGROUND OF THE INVENTION

TECHNICAL FIELD OF THE INVENTION

The present invention incorporates synthetic resin thermoplastic panels or pieces, such as baseboard-type panels, that are joined by an integral hinge and that include resilient injection molded portions. The hinged panel or piece of the present invention may be used in a variety of applications such as to provide sealing ends on or between hinged thermoplastic panels or to create resiliently closeable passages in or between hinged thermoplastic panels through which wires and other objects may be passed while maintaining an even surface appearance of the baseboard panel.

BACKGROUND

The present invention pertains generally to the field of thermoplastic constructions such as those in office furnishings and equipment, hospital and clinic furnishings, cafeteria furnishings, office partitions, etc.

Office furnishings and equipment, and the like, are often put into service in environments where there is exposure to impact and abrasion, such as through heavy foot traffic, hand contact, or exposure to things in motion, such as office equipment, dollies, carts, tables, chairs, wheelchairs, and hospital beds.

Office furnishings and equipment, and the like, are typically provided with baseboards, railings, and other pieces to resist or absorb impacts and scuffing, as well as to present and maintain an even and neat appearance in the presence of such wear and tear.

It is also often the case that such furnishings incorporate trim pieces, and the like, to provide a continuous covering or finish. However, such pieces must be produced so as to be securely incorporated into the balance of the furnishing piece, such as along the top or bottom of office partitions. Accordingly, it is desirable to be able to produce a thermoplastic piece or panel capable of secure incorporation into a top or bottom raceway or conduit of a furnishing piece such as a wall-type divider or partition panel.

It is also preferred in many applications for plastic or synthetic resin articles to have inherent flexibility in certain localized areas, without introducing irreversible distortion or fracture of the plastic during flexing. More specifically, many applications require portions of the synthetic resin article to be substantially rigid to provide structural integrity during its intended use. However, for ease of installation certain portions of the article should be relatively flexible, but not so soft as to affect the overall utility of the article for its intended use. Thus, the need arises for synthetic resin articles having a relatively flexible semi-rigid area connecting substantially more rigid areas, approximately analogous to a hinge. Such hinges in synthetic resin articles are used in numerous applications. A few illustrative examples are explicated to clarify, in a practical sense, the utility of such synthetic resin thermoplastic hinges.

Folding doors are often constructed of numerous rigid plastic panels joined by relatively flexible plastic hinges. The plastic joining material must be sufficiently flexible to permit the individual door panels to fold or collapse to nearly a face-to-face parallel geometry when the folding door is fully open (contracted). Yet the same flexible plastic joining material must be sufficiently durable to withstand many flexing operations, and to form an integral part of the door itself when the door is fully closed (extended). Thus, the plastic joining material must have a correct balance of flexibility, without being too soft, to function as an integral part of the closed door.

A major use for semi-rigid synthetic resin thermoplastics is for office construction and furnishing applications. For example, in office furnishing systems, a semi-rigid plastic is a very convenient way to join space separation panels at a variety of angles for a variety of office configurations, without incurring unacceptable expense in assembly and disassembly.

A further application to such office furnishings involves hinged access panels, such as baseboard-type panels, to enable easy access to office equipment, electrical cabinets, etc. Flexibility is clearly required for a hinge on a multi-sectioned access panel, but certain rigidity and structural integrity is also desirable.

As a final illustrative example, for raceway covers and baseboard panels as used in office furnishing systems it is desirable to have hinge-type flexibility while retaining rigidity and durability properties of sections of the hinged thermoplastic synthetic resin panels. Rigidity is required of the panels or pieces to maintain a structurally sound covering, while some flexibility at the hinges is needed for rapid installation in a variety of geometries of home, office, and industrial furnishing panels, dividers, and/or partitions.

These examples illustrate a few of the cases in which hinge areas in thermoplastic panels or pieces are desirable. One common method for constructing such hinges is to coextrude the rigid plastic material to have an integral score line extruded into the panel or piece that forms a hinge line in the direction of extrusion, along the line about which the final product is required to flex.

The hinged thermoplastic panel or piece of the present invention also preferably incorporates a resilient plastic portion that is configured to form sealing ends on or between a plurality of hinged thermoplastic panels or to create resiliently closeable passages in or between the hinged thermoplastic panels through which wires and other objects may be passed while maintaining an even surface appearance of the baseboard panel.

To achieve this end, it is often desirable to be able to take advantage of two or more plastic materials having different flexion and appearance qualities by incorporating them into a single part. This is complicated by the fact that attempts to incorporate different materials require a secondary adhesion operation. This secondary operation often involves specialized adhesives or the injection molding of different polymers under adverse conditions. Such adverse conditions: (1) may not allow the two materials to sufficiently adhere, or (2) may mar the surface or other aesthetic qualities of the part, or both (such as through the application of heat or pressure, or both). To address these and other problems, the present invention provides a method of integrating dissimilar synthetic resin polymers to one another.

It is also often desirable to be able to produce plastic composites capable of being used as sight and/or light barriers, as well as to produce products that present and maintain desirable aesthetic qualities such as those needed on office furnishings like room divider or partition panel raceway covers.

Also, in many instances, these pieces must be made to allow the passage of various electrical and signal transmission wires, fiber optic cables, and the like, which are often necessary to operate office equipment such as, for example, telephones, computers, copiers, printers, projectors, networks, lights, and electrical outlets.

To this end, office furnishing divider or partition panels normally have been provided with holes or gaps along a top, middle, or bottom portion to allow wires and cables to be passed through regions therein commonly referred to as raceways. However, the various potential applications of thermoplastic hinged baseboard panels, their arrangement, and their working environments make it difficult to predict where wire/cable access will be needed, and the size and number of wires or cables to be passed through at a given location.

One of the ways of constructing a thermoplastic baseboard hinge panel to have gaps therein or panels that form gaps between one or more of such panels, is to extrude a relatively rigid panel of material such as a rigid PVC. These panels are then cut to a desired length and a relatively flexible polymeric material, such as a flexible PVC material, is then adhered to the relatively rigid material through use of an adhesive, such as a cyanoacrylate adhesive, in a secondary hand operation.

There are several problems attendant to the use of such adhesives in hand operations. One problem is that of ventilation. The adhered pieces must normally be carefully stacked to provide sufficient curing and ventilation. Also, in the case of cyanoacrylate adhesives, the vapor issuing from the curing adhesive can form a white deposit on the finished pieces, often rendering them unacceptable to the manufacturing customer. Naturally, any gaseous emissions from curing adhesive may pose a health hazard to the operator.

The use of liquid adhesives in hand operations are also inefficient. Liquid adhesive can be spilled, requiring cleanup, and hand operations, even when carefully done, can lead to gaps in the alignment between the rigid and flexible portions. It is therefore more difficult to manufacture such pieces within required tolerances.

Finally, the use of liquid in hand operations must rely upon the operator to dispense the appropriate amount of adhesive uniformly to be sure that a strong bond is achieved. This is often difficult to do efficiently in repetitive, mass-production operations.

Accordingly, it is desirable to be able to produce a thermoplastic hinged baseboard panel that can accommodate, alternatively, the throughput of a small or great number of wires (or wires of a small or great diameter) or remain unused, while maintaining an even, aesthetically acceptable appearance and without the use of separable parts.

It is also desirable to be able to produce such a furnishing panel in a continuous process without the need for secondary, post-extrusion operations (that is, a piece or panel that can be produced in a continuous in-line process).

The present invention also produces a furnishing panel with a strong and uniform bond across the interface between the rigid and flexible sealing or resilient portions, while eliminating the environmental hazards, inefficiencies, and production objections discussed above.

Also, the present invention provides an aperture covering for a piece or panel which is durable and resists the impact and flexion often occurring in high traffic home, office, industrial environments, and the like.

In view of the present disclosure and/or through practice of the present invention, other advantages and the solutions to other problems may become apparent.

SUMMARY OF THE INVENTION

One embodiment of the present invention is directed to a panel for a furnishing piece that includes a thermoplastic piece that is adapted to be attached to the furnishing piece. The thermoplastic piece is formed with a plurality of outer cover sections connected by a center spine. The spine and the outer cover sections include inner and outer surfaces and a lateral terminal edge. The thermoplastic piece also includes an extension portion made from a thermoplastic material that is relatively more flexible than the thermoplastic piece. The extension portion is injection molded onto the respective the inner surfaces of the thermoplastic piece so as to extend beyond at least one of the respective the lateral terminal edges. In a variation of this embodiment, the center spine also incorporates a registration guide adapted to improve the precision of the location of the extension portion relative to the thermoplastic piece.

The thermoplastic piece is preferably fabricated from a material selected from the group consisting of rigid polyvinylchloride ("PVC") having a Shore D scale hardness of at least 75 according to the American Society for Testing and Materials ("ASTM") testing method D-785. Alternatively, the thermoplastic piece can be made from a material selected from the group consisting of rigid PVC having a Shore D hardness in the range of from about 50 to about 90 according to ASTM method D-785. More preferably, the thermoplastic piece can be made from a material selected from the group consisting of rigid PVC having a Shore D hardness in the range of from about 78 to about 82 according to ASTM method D-785.

In additional variations of this embodiment, the extension portion is selected from the group consisting of ethyl vinyl acetates, urethanes, thermoplastic urethanes, PVC-urethane alloys, alloyed vinyls, thermoplastic rubbers, polyester elastomers, and polytetramethylene glycol esters. More preferably, the extension portion is selected from the group consisting of ethyl vinyl acetates and urethanes having a Shore A hardness in the range of from about 60 to about 95 according to ASTM method D-2240.

The present invention is also directed to a partition panel that includes an elongated baseboard formed from a first polymeric extrudate having a lateral leading edge with inside and outside surfaces and further formed with longitudinal hinge portions connecting a center spine to outer sections. The elongated baseboard further includes a plurality of resilient extension members formed from a second polymeric extrudate having an attachment portion thermally welded proximate to the leading edge to the respective inside surfaces of the outer sections, the attachment portion being separated by a step-down from an exterior portion formed with an outside surface adapted to be substantially flush and coplanar with the respective outside surfaces of the baseboard. The second polymeric extrudate is preferably more flexible than the first polymeric extrudate. A variation of this embodiment includes a center spine of the first polymeric extrudate that further incorporates a registration guide adapted to improve the precision of the location of the extension members relative to the first polymeric extrudate.

In a variation of this embodiment, a workplace partition incorporates an elongated baseboard formed from a first polymeric material that has leading and trailing ends and therebetween a center spine having longitudinal hinge portions connected to outer cover sections each having opposite inner and outer faces. The elongated baseboard also includes resilient first and second extension pieces injection formed from a second polymeric material and molded proximate to the respective leading and trailing edges and onto the respective inner faces of the respective outer cover sections. Each extension piece includes a fascia portion extending outwardly from the leading and trailing edges, respectively. The fascia portions are generally coplanar with the outer faces and the first polymeric material is relatively less flexible than the second polymeric material. A further variation includes a center spine of the elongated baseboard that further incorporates a registration guide adapted to improve the precision of the location of the extension pieces relative to the respective leading and trailing edges.

The present invention further contemplates a partition baseboard assembly that includes a plurality of elongated polymeric extrudate baseboards formed with inside and outside faces and leading and trailing edges. Each baseboard includes a center spine with integrally hinged outer cover sections. Incorporated in the elongated baseboards are a plurality of flexible extension pieces formed from a polymeric material more resilient than the polymeric extrudate and thermally molded onto each respective inside face and proximate to the leading and trailing edges, respectively. The flexible extension pieces extend from the leading and trailing edges, respectively, so that, when a pair of the plurality of baseboards are positioned with a leading edge proximate to a trailing edge to form a gap therebetween, a pair of the plurality of flexible extension pieces resiliently covers the gap. A modification of this embodiment includes a registration guide formed in the center spine that is adapted to improve the precision of the location of the extension pieces relative to the respective leading and trailing edges. In a further variation, the pair of flexible extension pieces overlaps one another to resiliently seal the gap.

In yet another variation of the present invention, a polymeric extrudate member is described that includes a thermoplastic piece formed with a plurality of outer cover sections hingeably connected by a center spine, with the spine and each section including an inner and an outer surface, respectively. A gap surrounded by at least one peripheral edge is formed in each outer cover section and cooperatively positioned to establish a passageway when the outer cover sections are folded into an installed position about a furnishing piece. A plurality of extension pieces of a thermoplastic material, that are relatively more flexible than the thermoplastic piece, are injection molded onto the respective inner surfaces of the thermoplastic piece proximate to the at least one peripheral edge so as to extend about a portion of each of the gaps to resiliently and closeably seal the passageway. As with previous variations, the center spine of the elongated baseboard may also further incorporate a registration guide adapted to improve the precision of the location of the extension pieces relative to the passageway.

The present invention is also directed to a method for applying a thermoplastic polymeric portion to the surfaces at either end of a series of thermoplastic extrudate members each having leading and trailing edges, inside and outside surfaces proximate thereto, and a center spine hingeably connected to opposite outside cover sections. The method includes the steps of: (a) aligning a first thermoplastic extrudate member so as to position its leading edge in an injection mold cavity; (b) injection molding a plurality of thermoplastic polymeric portions onto a respective plurality of inside surfaces of the first thermoplastic extrudate member proximate to its leading edge; (c) transporting and aligning the first thermoplastic extrudate member so as to position its trailing edge in the injection mold cavity, and transporting aligning a second thermoplastic extrudate member so as to position its leading edge in the injection mold cavity; (d) injection molding substantially simultaneously (1) a plurality of thermoplastic polymeric portions onto the respective inside surfaces of the first thermoplastic extrudate member adjacent its trailing edge, and (2) a plurality of thermoplastic polymeric portions onto the surface of the second thermoplastic extrudate member adjacent its leading edge; (e) transporting the first thermoplastic extrudate member from the injection mold cavity, transporting and aligning the second thermoplastic extrudate member so as to position its trailing edge in the injection mold cavity, and transporting and aligning a third thermoplastic extrudate member so as to position its leading edge in the injection mold cavity; and (f) repeating steps (c) through (e) for fabricating successive thermoplastic extrudate members beyond the third thermoplastic extrudate member.

In this method, the center spine of the thermoplastic extrudate members may further include a registration guide. Also, the transporting and aligning steps may further include the step of registering the registration guide in the mold cavity to improve the alignment of the thermoplastic extension portions relative to the respective leading and trailing edges.

A variation of this method includes producing a plurality of polymeric extrudate members each having a center spine hingeably connected to opposite outside cover sections by employing the steps of: (a) aligning: (i) a first thermoplastic member of the plurality having a substantially flat first inside surface proximate to a first trailing edge; and (ii) a second thermoplastic member of the plurality having a substantially flat second inside surface proximate to a first leading edge and a second trailing edge; whereby the first trailing edge and the first leading edge are side by side in a molding relationship with an injection molding cavity; (b) injection molding a plurality of flexible thermoplastic members onto, respectively: (i) the first inside surface to extend outwardly from the first trailing edge, and (ii) the second inside surface to extend outwardly from the second leading edge; wherein the flexible thermoplastic members are relatively more flexible than the first and second thermoplastic members; (c) advancing the first and second members so as to align: (i) the second trailing edge of the second thermoplastic member of a polyvinylchloride material; and (ii) a third thermoplastic member of the plurality having a substantially flat third inside surface proximate to a second leading edge and a third trailing edge; whereby the second trailing edge and the second leading edge are side by side in a molding relationship with the injection molding cavity; (d) injection molding a plurality of flexible thermoplastic members onto, respectively: (i) the second inside surface to extend outwardly from the second trailing edge, and (ii) the third inside surface to extend outwardly from the third leading edge; wherein the flexible thermoplastic members are relatively more flexible than the second and third thermoplastic members; and (e) repeating steps (c) and (d) to fabricate fourth, fifth, and successive polymeric extrudate members of the plurality. In a variation of this method, each of the polymeric extrudate members of the plurality further incorporates a center spine having an integral registration guide adapted to improve the precision relative position of the extrudate members during the aligning and advancing steps. The method also contemplates polymeric extrudate members of the plurality that are fabricated from PVC and flexible members that are fabricated from a urethane material.

DESCRIPTION OF THE DRAWINGS

Without limiting the scope of the present invention as claimed below and referring now to the drawings, wherein like reference numerals across the several views refer to identical, corresponding, or equivalent parts:

DETAILED DESCRIPTION OF THE PREFERRED EMBODIMENTS

The following is a detailed description of a preferred embodiment of the proposed invention that is also considered to be the best mode.

Figure 1:
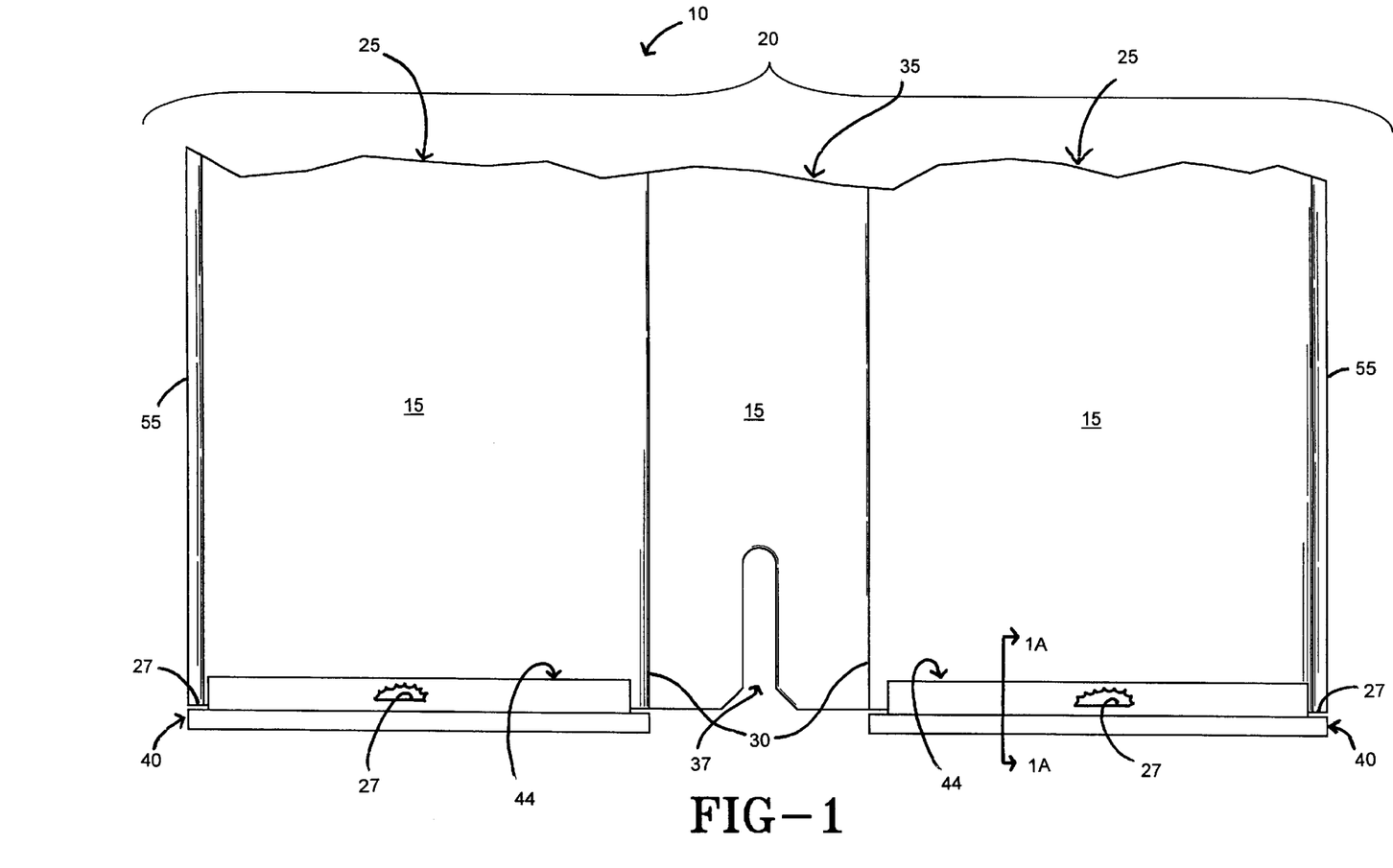
FIG. 1 is a planform view, in reduced scale, of an inside surface of a thermoplastic synthetic resin hinged panel designed for use as a baseboard panel raceway cover of an office divider or partition in accordance with an embodiment of the present invention.

FIG. 1 is a plan view of the inside surfaces of a thermoplastic, synthetic resin, polymeric baseboard panel 10 in accordance with one embodiment of the present invention, showing the inside, reverse, and non-facing side, surface, or face 15 of thermoplastic panel portion 20. Polymeric panel portion 20 is preferably formed from a relatively rigid or semi-rigid extrudate such as polyvinylchloride ("PVC") material. The panel portion 20 further includes outer cover sections 25 that are integrally and flexibly connected about longitudinal hinge elements 30 to center spine 35. The hinge elements 30 may be formed by any of a wide variety of acceptable methods including scoring, integrally forming, or both, either during or after extruding.

The relatively rigid polymeric material may be any extrudable material, such as those selected from the group consisting of rigid or semi-rigid PVC. Such materials preferably have a Shore D scale hardness of at least 50 according to American Society of Testing and Materials ("ASTM") method D-785, and more preferably in the range of from about 50 to about 90 according to ASTM method D-785, and even more preferably in the range of from about 78 to about 82 according to ASTM method D-785. An example of such a material is PVC Formulation 87256, commercially available from Geon Corporation.

Figure 2:
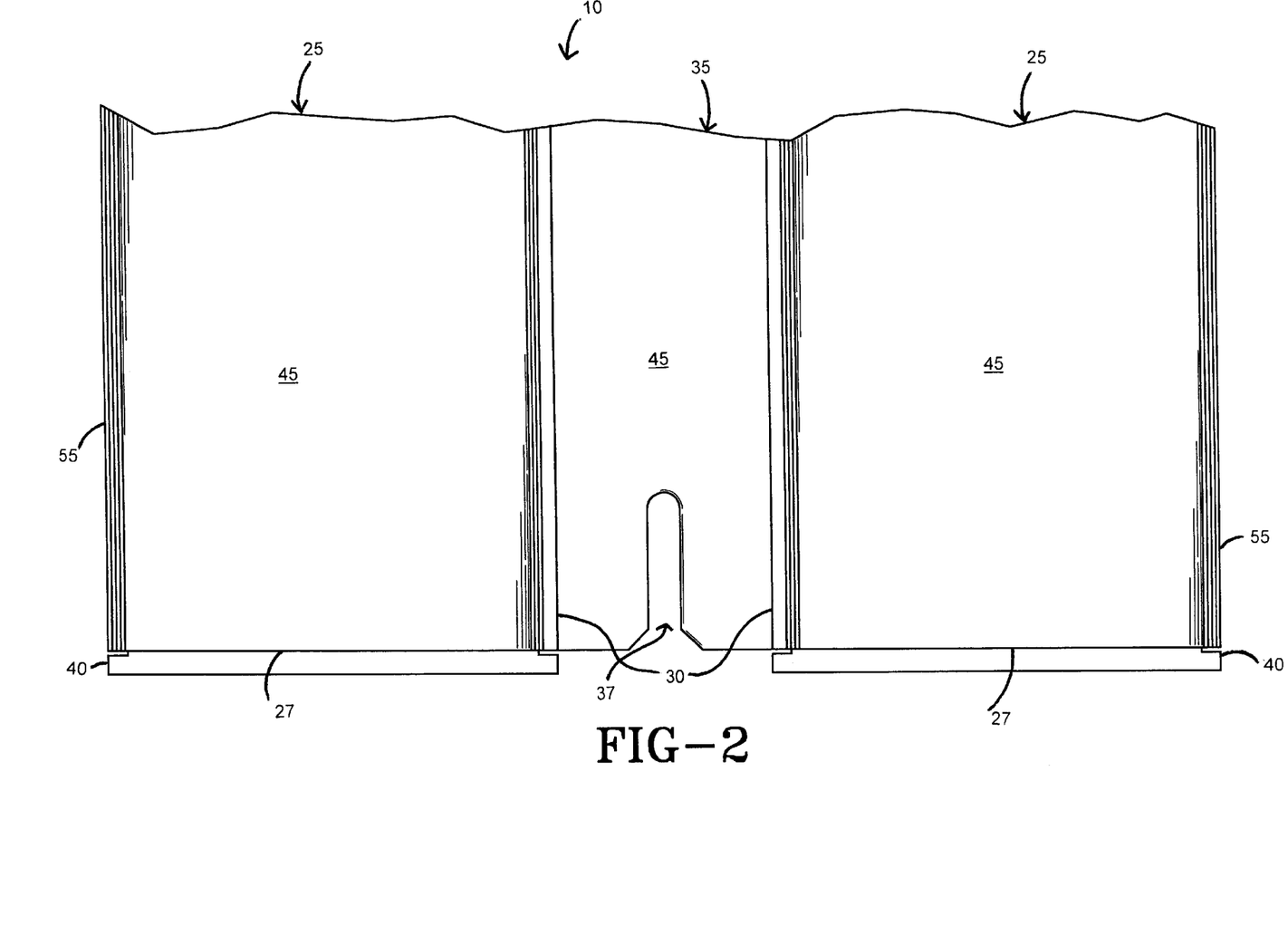
FIG. 2 is a planform view, in reduced scale, of an outside surface of the thermoplastic synthetic resin hinged panel of FIG. 1.
Figure 3:
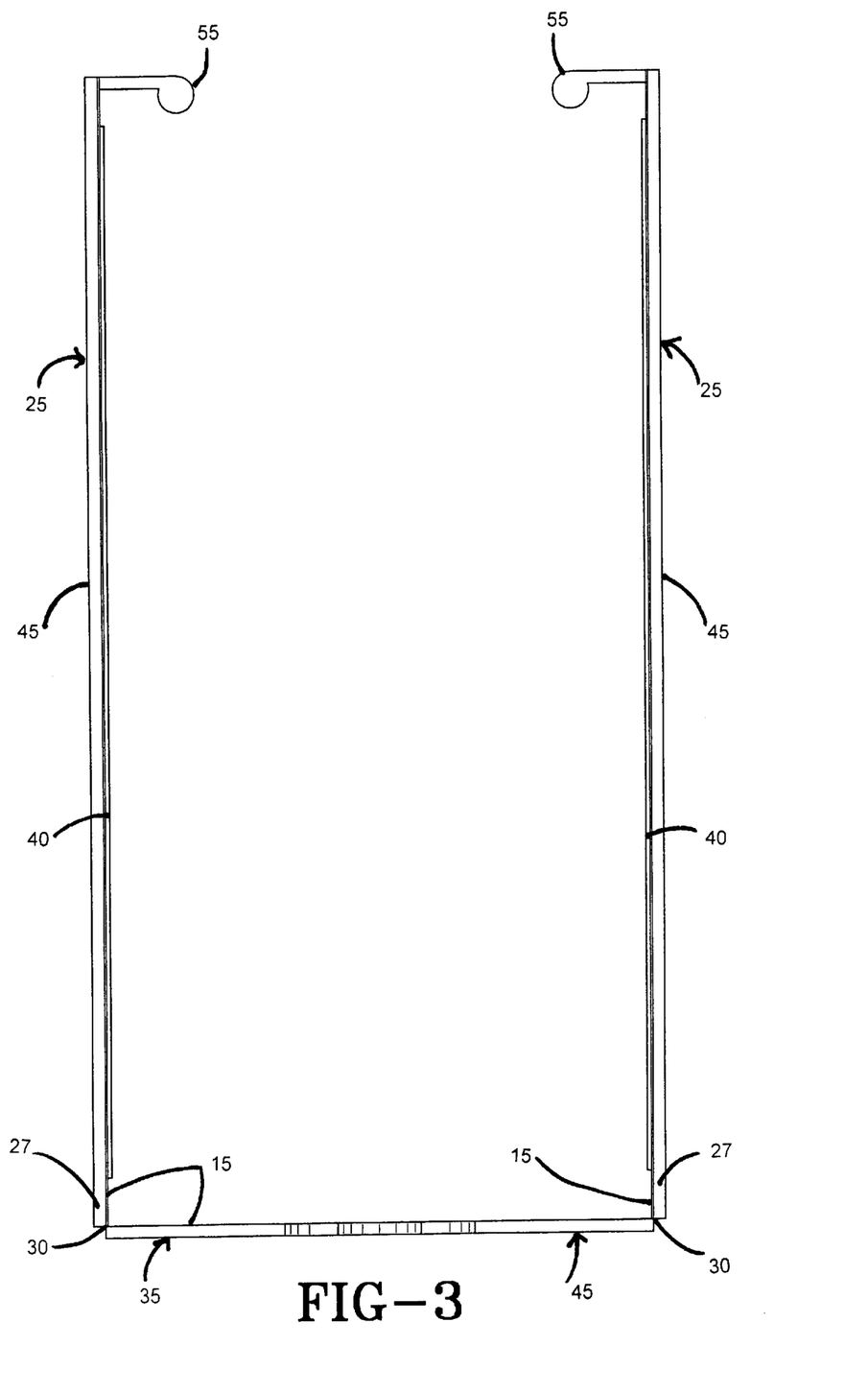
FIG. 3 is an end view, in enlarged scale, of the thermoplastic panel of FIGS. 1 and 2 wherein outer cover sections of the panel are folded up about integral hinges relative to a center spine section.

Affixed to a lateral terminal edge 27 of polymeric panel portion 20 is a flexible extension portion or piece 40 which is preferably injection molded onto inside surface 15 and is preferably of a urethane material that is relatively more flexible than the panel portion 20. FIG. 2 shows a front, facing view of the outside surface or face 45 of baseboard panel 10. FIG. 3 shows an edge view of the panel 10 showing outer cover sections 25 in a folded up position relative to center spine 35 wherein their respective inside sides 15 are arranged in an opposing and facing relationship.

As used herein, the term "relatively flexible" may include, for instance, comparative references to the flexibility as between rigid and semi-rigid materials, rigid and flexible materials, semi-rigid materials and flexible materials, etc. In this regard, the relatively flexible materials may include ethyl vinyl acetate (EVA), urethanes (such as thermoplastic polyurethanes), PVC-urethane alloys (such as those commercially available from Alpha Chemical & Plastics Corporation), alloyed vinyls, thermoplastic rubbers (TPRs), and polyester elastomers, such as Hytrel® commercially available from DuPont®. Most preferred is the polytetramethylene glycol ether-type polyurethane elastomers, such as Pellethane®, commercially available from Dow Chemical Company, of which grade 2103-70A is preferred. Pellethane® was found to bond extremely well when injection molded onto a PVC substrate and gave adhesion across the length of the applied piece. The relatively more flexible polymeric material may be selected from the group consisting of those preferably having a Shore A scale hardness in the range of from about 60 to about 95 according to ASTM method D-2240, and more preferably in the range of from about 70 to about 80 according to ASTM method D-2240.

An example of a urethane material which may be used in accordance with the present invention, and which is preferred, is Pellethane®, commercially available from Dow Chemical. An example of an ethylene-vinyl acetate copolymer that may also be used in accordance with the present invention is ELVAX®, commercially available from Dow Chemical.

As is described in more detail in co-owned U.S. Pat. Nos. 5,814,391 and 5,879,770, which are incorporated by reference herein in their entirety, it is desirable to improve or precisely register the panel portion 20 with respect to the injection molding equipment during manufacture so that the extension pieces 40 can be accurately aligned, located, and injection molded onto the panel portion 20. To accomplish the improved or precision registration, polymeric portion 20 is formed, preferably in center spine 35, with a registration recess 37. The recess 37 may be formed by stamping or any other similar means of imprinting or removing material from the panel. Although only a single registration recess has been reflected in the various drawings, one or more registration recesses may be incorporated into the design for improved positioning and alignment during the fabrication process. Moreover, any of a wide variety of registration recess shapes may be incorporated with equal effectiveness.

Figure 1A:
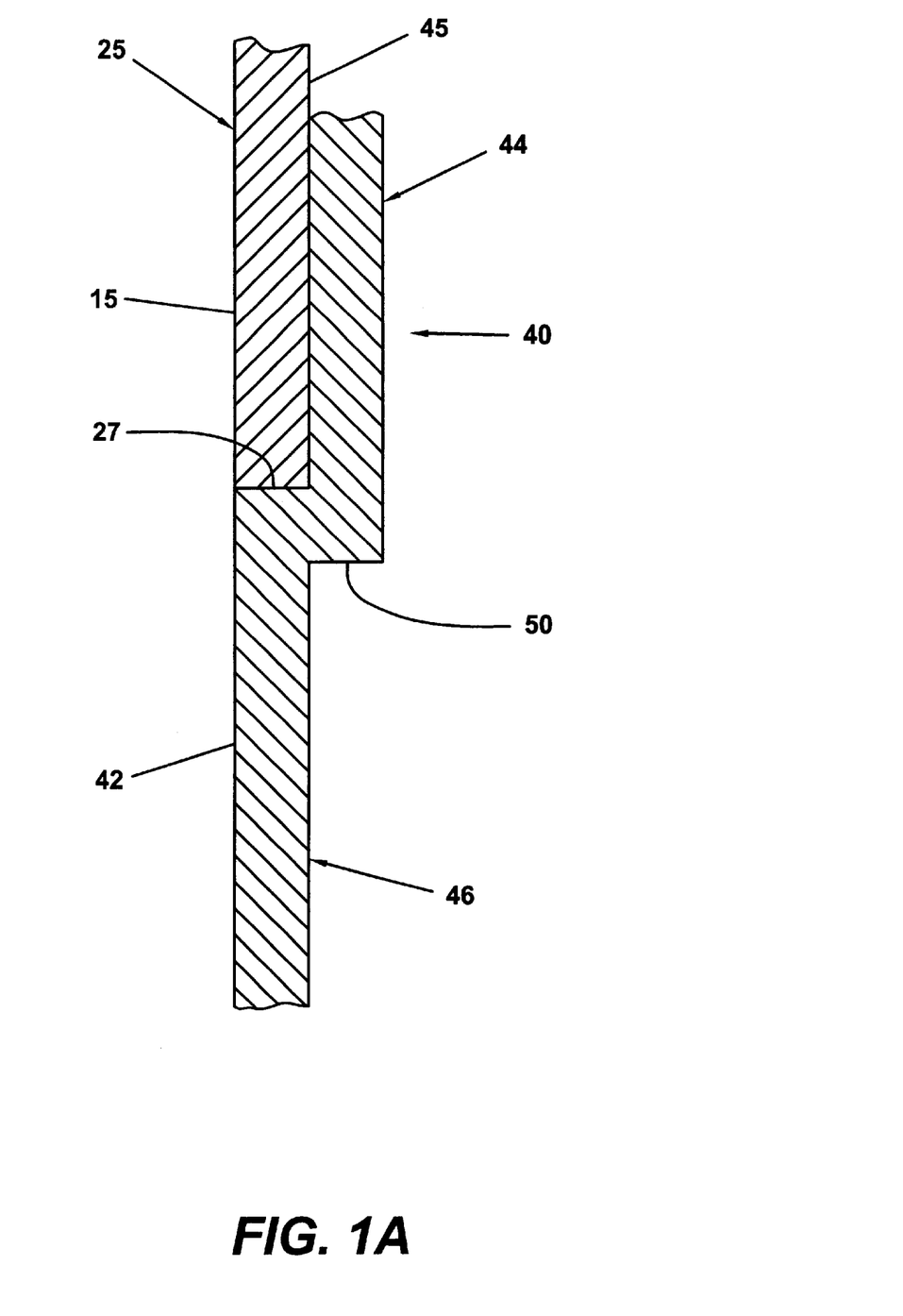
FIG. 1A is a cross-sectional view, in enlarged scale, taken along section line 1A—1A of FIG. 1.

As can be appreciated from FIGS. 1, 2, and 3 with particular reference to FIG. 1A, flexible, resilient extension piece 40 preferably has a cross-section with a step-down 50. The step-down 50 improves the aesthetic appearance of the panel 10 by establishing the outside surface 42 of resilient extension piece 40, which extends from polymeric panel portion 20, to be substantially flush with front surface 45. The extension piece 40 also includes an attachment portion 44 that is injection molded onto the inner surface 15 of the outer sections 25. The attachment portion 44 is separated by the step-down 50 from a fascia portion 46. Alternatively, but less preferably, the extension piece 40 may be secured to the inner surface 15 by fasteners such as rivets, bolts, screws, various types of press-fit plastic and metal nails, thermal welding, and fast-curing adhesives including heat, microwave, ultraviolet, and ultrasonically, electromechanically, and electromagnetically curable adhesives.

As can be understood with reference to FIGS. 1, 2, and 3, the hinge elements 30 are preferably integrally formed with the thermoplastic panel portion 20 during the extrusion process. The thermoplastic material of the hinge elements 30 preferably has a thickness that is less than the thickness of the outer sections and center spine 25, 35. Further, the hinge elements 30 are preferably formed such that a score line is formed between the facing edges of the thicker regions of the outer sections and center spine 25, 35 along the hinge line.

Alternatively, the hinge elements may be formed along the regions of the hinge lines shown in FIGS. 2 and 3 whereby the hinge elements are formed to have the same thickness as the surrounding thermoplastic material of the outer sections and center spine 25, 35, and a score line is formed or scribed into the thermoplastic material along the hinge line during or after extrusion. In this variation, the score line creates a frangible region along the hinge line that severs the outermost region of material of the outer cover sections 25 from that of the center spine portions 35, along the hinge lines 30, when the outer cover portions 25 are folded into the upright position shown in FIG. 3. Additionally, hinge elements 30 may be formed using any of the embodiments and methods described in co-owned U.S. Pat. No. 4,463,046, which is hereby incorporated herein by reference in its entirety.

With continued reference to FIGS. 1, 2, and 3, the panel 10 also incorporates engagement rails 55 that project from the inside surface 15. The engagement rails 55 are adapted and oriented to engage a fastening device on the furnishing piece, such as an office divider or partition, when the outer cover sections 25 are raised into an upright, installation position relative to center spine 35.

Figure 4:
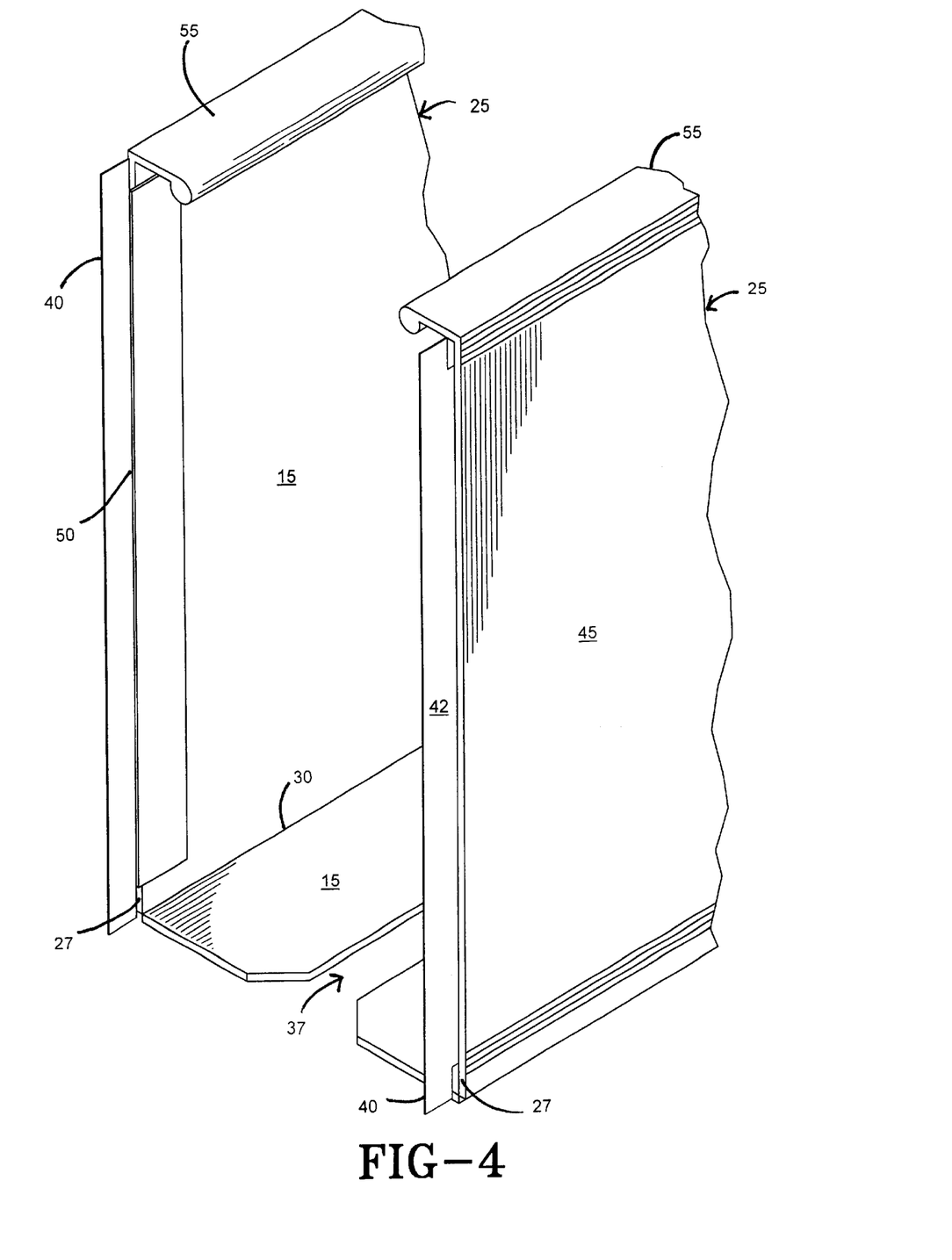
FIG. 4 is an elevated perspective view, in enlarged scale, of a portion of the thermoplastic hinged panel of FIGS. 1 and 2.

Referring next to FIG. 4, the panel 10 of FIG. 3 is depicted in an elevated perspective view having the outer cover sections 25 folded into an upright, installation position relative to center spine 35. This view reflects the configuration of the panel 10 after it has been installed onto a furnishing piece, such as, for example, an office partition or divider, so as to cover a portion of the furnishing piece, such as, for example, a raceway or conduit pathway in a partition or divider.

Figure 5:
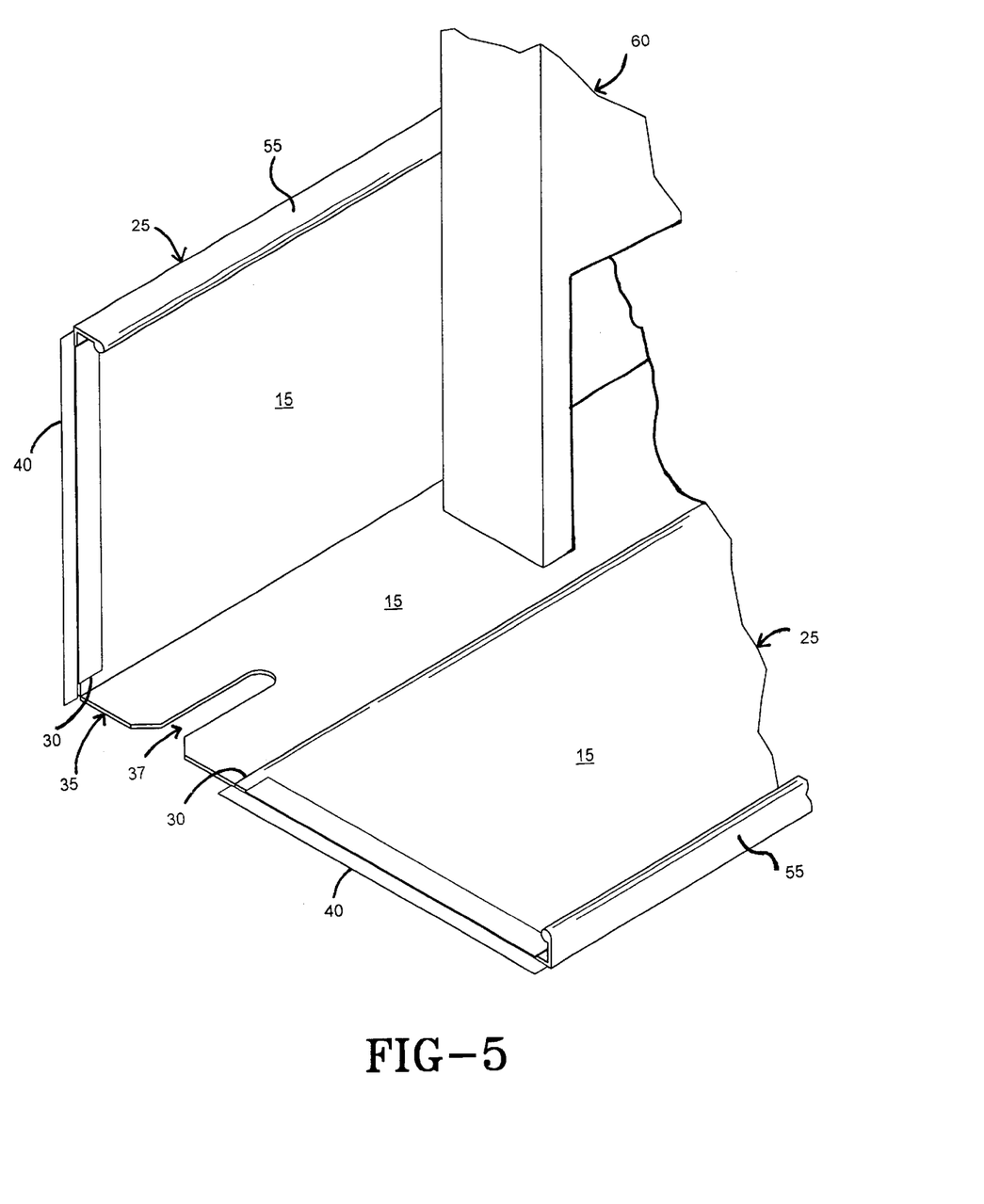
FIG. 5 is an elevated perspective view, in enlarged scale, of a portion of the thermoplastic hinged panel of FIGS. 1 and 2 wherein the panel is partially installed onto an office furnishing divider or partition panel.

With reference now to FIG. 5, the thermoplastic panel 10 is shown partially installed onto a furnishing piece 60, such as, for example, an office divider or partition. The panel 10 is installed about a bottom section of the furnishing piece 60 so as to cover a wire conduit or raceway that is incorporated into the piece 60. Although not depicted in the various drawings in detail, the manufacturing registration guide 37 is also well-suited for use as an installation guide for precision positioning and installation of the panel 10 onto the furnishing piece 60. One having skill in the art will recognize that the upright floor posts or stands of the furnishing piece that rest against a floor can be adapted to also act as a guide pin over which the registration guide 37 can be inserted during installation. In this variation, the panel 10 can be sized longitudinally to correspond with the predetermined length of the furnishing piece 60, or some predetermined size that is less than the total length of the piece 60.

Figure 6:
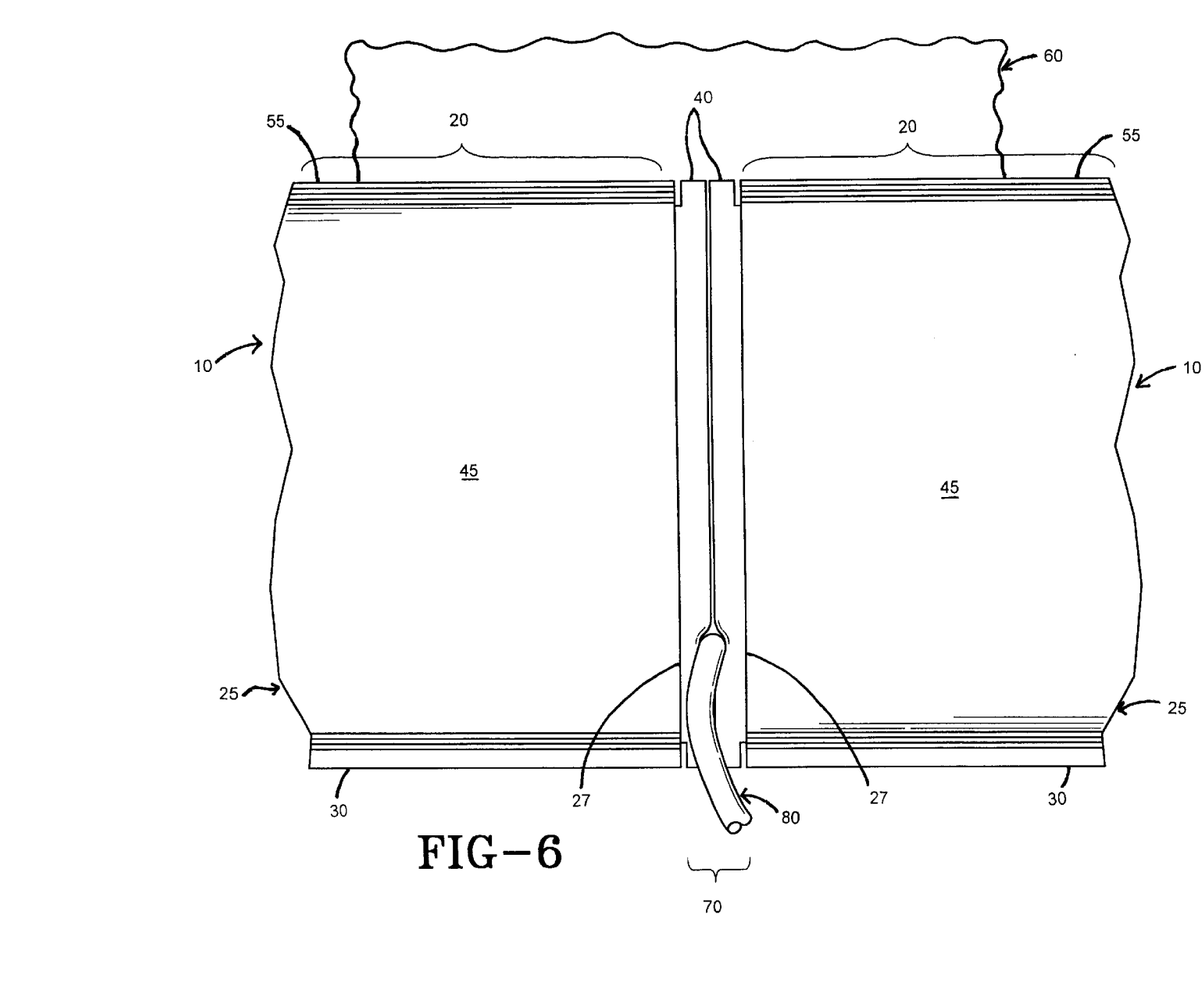
FIG. 6 is a plan view, in reduced scale, of the outside of a plurality of the thermoplastic panels of FIGS. 1 and 2 in an abutting relationship and installed onto an office furnishing divider or partition panel.

In FIG. 6, a plurality of thermoplastic, synthetic resin panels 10 are shown arranged end-to-end and installed about the furnishing piece 60. With this configuration, the flexible extension pieces 40 are positioned end-to-end in an adjacent, sufficiently close relationship so as to form a resiliently closeable passageway or gap 70 that is covered by the extension pieces 40. As shown in FIG. 6, a wire is projecting through the passageway 70 and the resilient extension pieces 40 are depicted in a partially deflected orientation in the region where the edges of the pieces 40 contact the wire 80. The gap formed between baseboard panels 10, i.e. passageway 70, may be any appropriate width depending upon the intended application. For typical office or industrial applications, this gap may preferably be from about ½ inch to about 2 inches. With this configuration, the wire 80 may be freely passed through the passageway 70 along with a plurality of other such wires, cables, tubes, pipes, fiber optic cables, and the like, without disruption to, or adverse effect upon, the overall aesthetic appearance of the baseboard panel 10. The passageway 70 is also protected from accumulation of dust and debris that may be incident to an office or industrial workspace where the panel 10 and furnishing piece 60 are installed.

Figure 7:
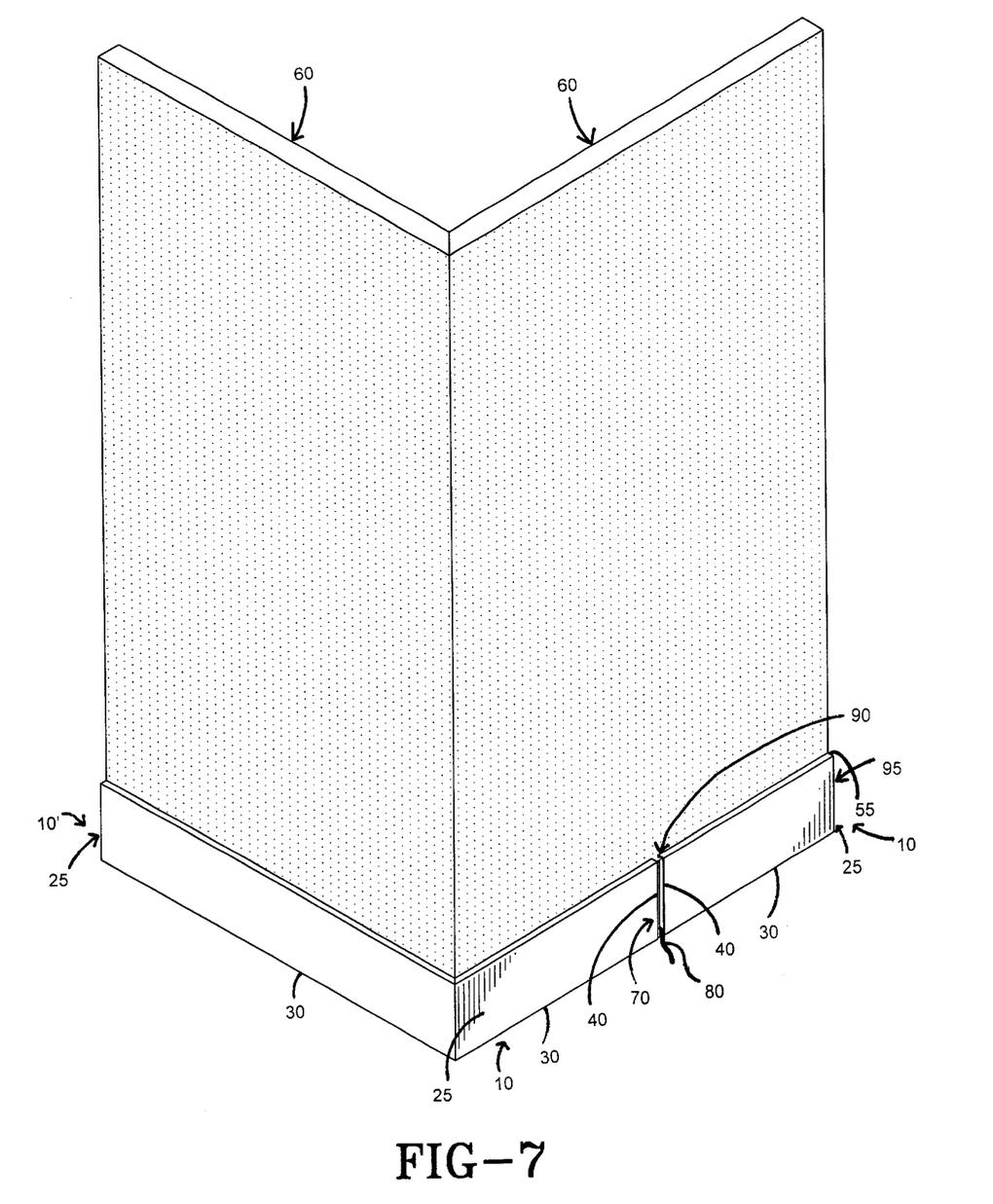
FIG. 7 is an elevated perspective view, in reduced scale, of the installed thermoplastic panels of FIG. 6.

An office furnishing assembly is reflected in FIG. 7 and it includes a plurality of thermoplastic panels 10 in a baseboard configuration installed about the bottom portion of furnishing pieces 60, which are themselves configured as office or industrial space partitions or dividers. As in FIG. 6, the wire 80 is shown projecting through the adjacent flexible extension pieces 40. Also shown are additional thermoplastic baseboard panels 10' that do not incorporate the flexible extension pieces of baseboard panels 10. However, although hidden from view in FIG. 7 by the furnishing pieces 60, the thermoplastic baseboard panels 10' incorporate the other features of the panels 10 such as the registration guide 37, the outer sections 25, and the center spine 35, among other similar or identical elements and features.

Figure 8:
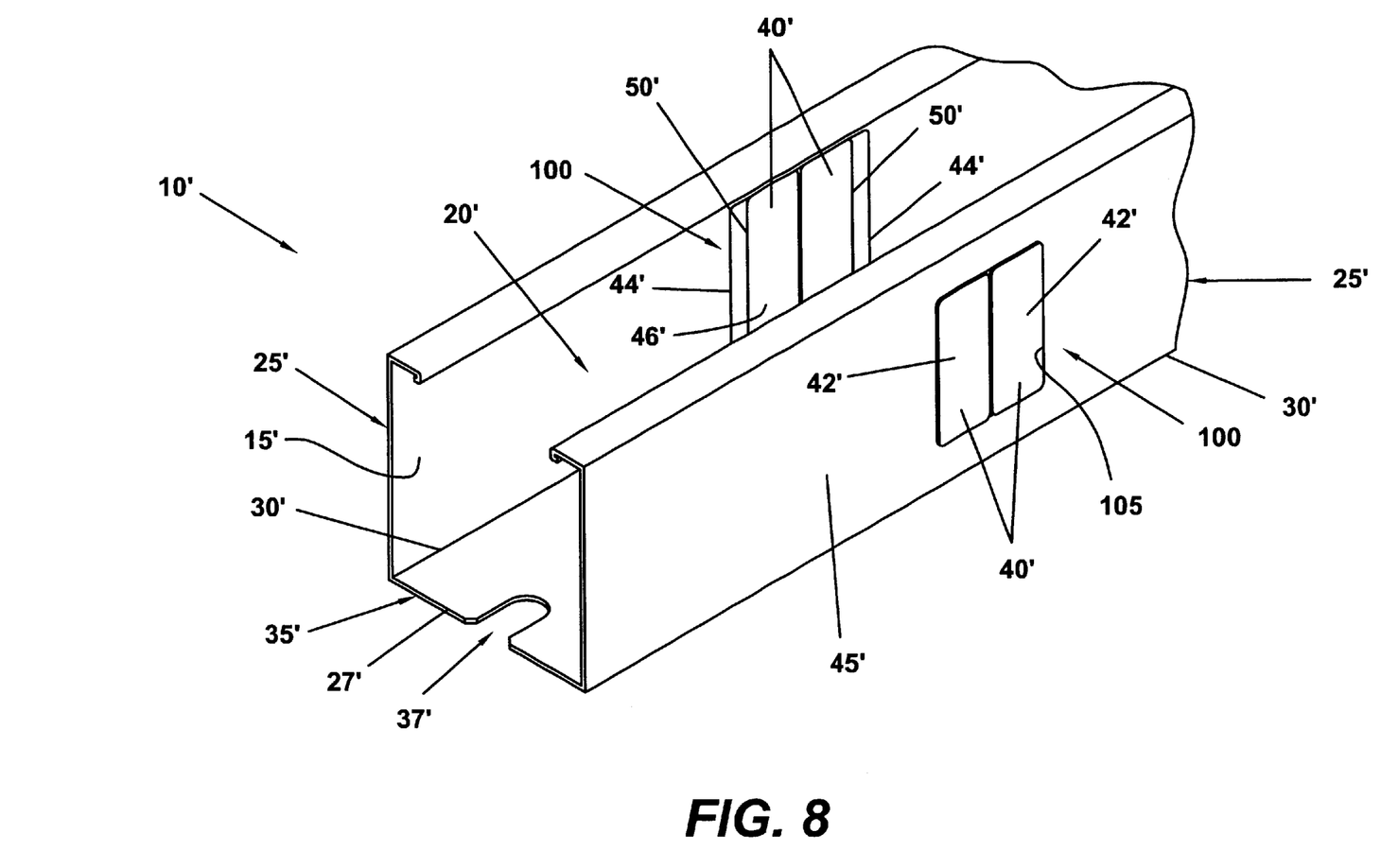
FIG. 8 is an elevated perspective view, in reduced scale, of a variation of the preceding embodiment of FIGS. 1–7.

Referring next to FIG. 8, a variation of the preceding embodiment and modifications is shown. An elongated baseboard panel 10' is shown in an elevated perspective view. As with preceding variations, the panel 10' includes an inside surface or face 15' and an outside surface 45' of thermoplastic panel portion 20'. The panel portion 20' further includes outer cover sections 25' that are integrally and flexibly connected about longitudinal hinge elements 30' to center spine 35'. Affixed to a lateral terminal edge 27' is a registration guide 37'. A plurality of flexible extension portions or pieces 40' are preferably injection molded onto inside surface 15'. Preferably, they are formed from a urethane material that is relatively more flexible than the panel portion 20'. The panel 10' also includes gaps 100, each surrounded by at least one peripheral edge 105, that form a passageway when the outer cover sections 25' are folded up into a facing and opposing relationship about, for example, a baseboard or conduit portion of a partition or divider (not shown). The flexible, resilient extension pieces 40' preferably have a cross-section with a step-down 50'. The step-down 50' establishes the outside surface 42' of resilient extension pieces 40', which extend to resiliently and closeably seal the passageway, to be substantially flush with front surface 45'. The extension piece 40' also includes an attachment portion 44' that is preferably injection molded onto the inner surface 15' of the outer sections 25'. The attachment portion 44' is separated by the step-down 50' from a fascia portion 46'.

To produce a baseboard panel such as is shown and described in the preceding disclosure, a semi-rigid or rigid PVC material is extruded to form an appropriately sized and shaped profile which has a reverse and facing surface such as surfaces 15 and 45, respectively. As the polymeric panel portion is moved along to the end of the extruder line where it is cured, individual sections of the polymeric material are cut to the desired length. Typical of lengths for use in office applications may be in the range of from about ½-foot to about 8 feet. Although a generally planar lateral profile of the baseboard panel is described in the disclosure and the drawings, any number of variations of various sizes and shapes are also equally achievable.

The terminal end of the cut extrudate is then guided to a position where a guide pin of an injection mold (not shown) engages the lateral terminal edge 27, 27' or the registration guide 37, 37' and the injection mold is placed against reverse or inner surface 15. Flexible extension portion 40 is then injection molded in place onto the terminal lateral edge 27, 27' or end of the polymeric panel 20. Each polymeric panel 20 includes a leading edge or end 90 and an opposite trailing end or edge 95 (see FIG. 7). Once the leading, lateral terminal end 90 of the first polymeric panel 20 has been injection molded to have an integral, flexible extension portion 40, the next panel is moved into a position such that its respective leading edge, and the trailing end 95 of the first panel, if desired, can be provided with respective flexible extension portions, preferably simultaneously. This process can then be repeated for subsequent panels, making the injection molding process more efficient by increasing throughput.

The extension portions may be injection molded in place by using, foe example, an injection molding clamp such as Model WDH-35-S Vertical Clamp, Horizontal Injection, Insert Molding Machine, commercially available from Autojectors, Inc. of Albion, Ind.

As can be appreciated from the present disclosure, the panel and panel arrangements of the present invention may be used for any of a wide variety of uses, such as in baseboards, along the tops, sides, midsections, and bottoms of furnishing pieces such as office furniture, such as partitions and dividers, and even for household use. Producing panels and panel arrangements for a particular application will be a matter of selecting dimensions, shapes, and profiles for the rigid and flexible portions.

The present invention also includes a method of sequentially applying flexible polymeric portions to the surfaces at either end of a series of thermoplastic extrudate members each having leading and trailing edges and surfaces adjacent thereto. The method in broadest terms includes the steps of: (a) aligning a first rigid thermoplastic extrudate member so as to position its leading edge in an injection mold cavity; (b) injection molding a flexible polymeric portion onto the surface of the first rigid extrudate member adjacent its leading edge; (c) transporting the first rigid thermoplastic extrudate member so as to position its trailing edge in the injection mold cavity and transporting a second thermoplastic extrudate member so as to position its leading edge in the injection mold cavity; (d) injection molding substantially simultaneously (1) a flexible polymeric portion onto the surface of the first rigid thermoplastic extrudate member adjacent its trailing edge, and (2) a flexible polymeric portion onto the surface of the second rigid thermoplastic extrudate member adjacent its leading edge; (e) transporting the first rigid thermoplastic extrudate member from the injection mold cavity, transporting the second rigid thermoplastic extrudate member so as to position its trailing edge in the injection mold cavity, and transporting a third rigid thermoplastic extrudate member so as to position its leading edge in the injection mold cavity; and (f) repeating steps (d) and (e) for subsequent rigid thermoplastic extrudate members beyond the third rigid thermoplastic extrudate member and beginning with the third rigid thermoplastic extrudate member. An apparatus used to perform the sequential attachment of the present invention is depicted and described in previously mentioned U.S. Pat. Nos. 5,814,391 and 5,879,770.

While preferred embodiments of the invention have been illustrated and described in detail, it will be within the ability of one skilled in the extrusion and injection molding arts to make modifications in the details of construction of the present invention, such as through the substitution of equivalent materials and parts and the arrangement of parts, or the application of equivalent process steps, without departing from the spirit of the invention and the scope of the following claims.

What is claimed is:

1. A panel for a furnishing piece, said panel comprising:
   a thermoplastic piece adapted to be attached to the furnishing piece and being formed with a plurality of outer cover sections connected by a center spine, with the spine and each section including an inner and an outer surface and a lateral terminal edge, respectively; and
   an extension portion of a thermoplastic material, the thermoplastic material being relatively more flexible than the thermoplastic piece, the extension portion being injection molded onto the respective inner surfaces of the thermoplastic piece so as to extend beyond at least one of the respective the lateral terminal edges.

2. A panel for a furnishing piece according to claim 1 wherein the center spine of the thermoplastic piece further incorporates a registration guide adapted to improve the precision of the location of the extension portion relative to the thermoplastic piece.

3. A panel for a furnishing piece according to claim 1 wherein the thermoplastic piece comprises a material selected from the group consisting of rigid PVC having a Shore D hardness of at least 75 according to ASTM method D-785.

4. A panel for a furnishing piece according to claim 1 wherein the thermoplastic piece comprises a material selected from the group consisting of rigid PVC having a Shore D hardness from between 50 to 90 according to ASTM method D-785.

5. A panel for a furnishing piece according to claim 1 wherein the thermoplastic piece comprises a material selected from the group consisting of rigid PVC having a Shore D hardness from between 78 to 82 according to ASTM method D-785.

6. A panel for a furnishing piece according to claim 1 wherein the extension portion is selected from the group consisting of ethyl vinyl acetates, urethanes, thermoplastic urethanes, PVC-urethane alloys, alloyed vinyls, thermoplastic rubbers, polyester elastomers, and polytetramethylene glycol esters.

7. A panel for a furnishing piece according to claim 1 wherein the extension portion is selected from the group consisting of ethyl vinyl acetates and urethanes having a Shore A hardness from between 60 to 95 according to ASTM method D-2240.

8. A partition panel, comprising:
   an elongated baseboard formed from a first polymeric extrudate having a lateral leading edge with inside and outside surfaces and further formed with longitudinal hinge portions connecting a center spine to outer sections;
   a plurality of resilient extension members formed from a second polymeric extrudate having an attachment portion thermally welded proximate to the leading edge to the respective inside surfaces of the outer sections, the attachment portion being separated by a step-down from an exterior portion formed with an outside surface adapted to be substantially flush and coplanar with the respective outside surfaces of the baseboard; and wherein the second polymeric extrudate is more flexible than the first polymeric extrudate.

9. A panel according to claim 8 wherein the center spine of the first polymeric extrudate further incorporates a registration guide adapted to improve the precision of the location of the extension members relative to the first polymeric extrudate.

10. A workplace partition, comprising:
an elongated baseboard formed from a first polymeric material and having leading and trailing ends and therebetween a center spine having longitudinal hinge portions connected to outer cover sections each having opposite inner and outer faces;

resilient first and second extension pieces injection formed from a second polymeric material and molded proximate to the respective leading and trailing edges and onto the respective inner faces of the respective outer cover sections and wherein each extension piece includes a fascia portion extending outwardly from the leading and trailing edges, respectively, and wherein the fascia portions are generally coplanar with the outer faces; and wherein the first polymeric material is relatively less flexible than the second polymeric material.

11. A partition according to claim 10 wherein the center spine of the elongated baseboard further incorporates a registration guide adapted to improve the precision of the location of the extension pieces relative to the respective leading and trailing edges.

12. An partition baseboard assembly, comprising:
a plurality of elongated polymeric extrudate baseboards formed with inside and outside faces and leading and trailing edges and each including a center spine with integrally hinged outer cover sections;

a plurality of flexible extension pieces formed from a polymeric material more resilient than the polymeric extrudate and thermally molded onto each respective inside face and proximate to the leading and trailing edges, respectively; and wherein the flexible extension pieces extend from the leading and trailing edges, respectively, so that, when a pair of the plurality of baseboards are positioned with a leading edge proximate to a trailing edge to form a gap therebetween, a pair of the plurality of flexible extension pieces resiliently covers the gap.

13. An assembly according to claim 12 wherein the center spine of the elongated baseboard further incorporates a registration guide adapted to improve the precision of the location of the extension pieces relative to the respective leading and trailing edges.

14. An assembly according to claim 12 wherein the pair of flexible extension pieces overlap.

15. A polymeric extrudate member, comprising:
a thermoplastic piece formed with a plurality of outer cover sections hingeably connected by a center spine, with the spine and each section including an inner and an outer surface, respectively;

a gap surrounded by at least one peripheral edge and formed in each outer cover section and cooperatively positioned to establish a passageway when the outer cover sections are folded into an installed position about a furnishing piece; and a plurality of extension pieces of a thermoplastic material relatively more flexible than the thermoplastic piece and injection molded onto the respective inner surfaces of the thermoplastic piece proximate to the at least one peripheral edge so as to extend about a portion of each of the gaps to resiliently and closeably seal the passageway.

16. A member according to claim 15 wherein the center spine of the elongated baseboard further incorporates a registration guide adapted to improve the precision of the location of the extension pieces relative to the passageway.

17. A method for applying a thermoplastic polymeric portion to the surfaces at either end of a series of thermoplastic extrudate members each having leading and trailing edges, inside and outside surfaces proximate thereto, and a center spine hingeably connected to opposite outside cover sections, said method comprising the steps of:

(a) aligning a first thermoplastic extrudate member so as to position its leading edge in an injection mold cavity;

(b) injection molding a plurality of thermoplastic polymeric portions onto a respective plurality of inside surfaces of the first thermoplastic extrudate member proximate to its leading edge;

(c) transporting and aligning the first thermoplastic extrudate member so as to position its trailing edge in the injection mold cavity, and transporting aligning a second thermoplastic extrudate member so as to position its leading edge in the injection mold cavity;

(d) injection molding substantially simultaneously (1) a plurality of thermoplastic polymeric portions onto the respective inside surfaces of the first thermoplastic extrudate member adjacent its trailing edge, and (2) a plurality of thermoplastic polymeric portions onto the surface of the second thermoplastic extrudate member adjacent its leading edge;

(e) transporting the first thermoplastic extrudate member from the injection mold cavity, transporting and aligning the second thermoplastic extrudate member so as to position its trailing edge in the injection mold cavity, and transporting and aligning a third thermoplastic extrudate member so as to position its leading edge in the injection mold cavity; and (f) repeating steps (c) through (e) for fabricating successive thermoplastic extrudate members beyond the third thermoplastic extrudate member.

18. The method of claim 17 wherein the center spine of the thermoplastic extrudate members further includes a registration guide and wherein the transporting and aligning steps further include the step of registering the registration guide in the mold cavity to improve the alignment of the thermoplastic extension portions relative to the respective leading and trailing edges.

19. A method of producing a plurality of polymeric extrudate members each having a center spine hingeably connected to opposite outside cover sections, said method comprising the steps of:

(a) aligning:
(i) a first thermoplastic member of the plurality having a substantially flat first inside surface proximate to a first trailing edge; and
(ii) a second thermoplastic member of the plurality having a substantially flat second inside surface proximate to a first leading edge and a second trailing edge;

whereby the first trailing edge and the first leading edge are side by side in a molding relationship with an injection molding cavity;

(b) injection molding a plurality of flexible thermoplastic members onto, respectively: (i) the first inside surface to extend outwardly from the first trailing edge, and (ii) the second inside surface to extend outwardly from the second leading edge;

wherein the flexible thermoplastic members are relatively more flexible than the first and second thermoplastic members;

(c) advancing the first and second members so as to align:
(i) the second trailing edge of the second thermoplastic member of a polyvinylchloride material; and
(ii) a third thermoplastic member of the plurality having a substantially flat third inside surface proximate to a second leading edge and a third trailing edge;

whereby the second trailing edge and the second leading edge are side by side in a molding relationship with the injection molding cavity;

(d) injection molding a plurality of flexible thermoplastic members onto, respectively: (i) the second inside surface to extend outwardly from the second trailing edge, and (ii) the third inside surface to extend outwardly from the third leading edge;

wherein the flexible thermoplastic members are relatively more flexible than the second and third thermoplastic members; and (e) repeating steps (c) and (d) to fabricate fourth, fifth, and successive polymeric extrudate members of the plurality.

20. The method of claim 19 wherein each of the polymeric extrudate members of the plurality further incorporates a center spine having an integral registration guide adapted to improve the precision relative position of the extrudate members during the aligning and advancing steps.

21. The method of claim 19 wherein each of the polymeric extrudate members of the plurality is fabricated from a polyvinylchloride material.

22. The method of claim 19 wherein each of the flexible members is fabricated from a urethane material.

* * * * *